UNITED STATES PATENT OFFICE.

GEORGE C. WARR, OF NEW YORK, N. Y., ASSIGNOR TO EDFA PRODUCE COMPANY.

ART OF PRODUCING EDIBLE AND ODORLESS FAT FROM COCOANUTS AND OTHER SIMILAR NUTS.

992,525.　　　　　　　　　Specification of Letters Patent.　　Patented May 16, 1911.

No Drawing.　　　Application filed March 28, 1907.　Serial No. 364,987.

*To all whom it may concern:*

Be it known that I, GEORGE C. WARR, a citizen of the United States, residing at the borough of Brooklyn, city of New York, county of Kings, and State of New York, have invented certain new and useful Improvements in the Art of Producing Edible and Odorless Fat from Cocoanuts and other Similar Nuts, of which the following is a specification.

My invention relates to the art of extracting and refining oils and vegetable fats from cocoanuts and other similar nuts, and more particularly to that branch of this art especially adapted for the treatment of fresh nuts as distinguished from copra or dried nuts of any other kinds having the characteristics of cocoanuts.

The main object of my invention is to extract and refine the oil from cocoanuts or other similar nuts, in a manner to eliminate any volatile acids developed through the aging of the nuts, and thus check fermentation in the nut tissues and in the extracted oil with a resultant product of a vegetable oil having no odor or taste characteristic of its origin, and with a resultant by-product of a pure, sweet, desiccated nut, neither the product nor the by-product being subject to deterioration through fermentation.

A further object is to extract and refine the oil by a process which will destroy and eliminate the germ of fermentation as distinguished from merely driving off the products of such by means of solvents or other chemicals.

A still further object is to extract and refine the oil by a process which will produce substantially the maximum volume of oil from the meat or kernal by a single pressing or run, and without destroying the fatty tissue of the nuts.

A still further object is to extract and refine the oil by a process not requiring expensive or deleterious chemicals and which will check any fermentation already developed in the nut, precipitating or coagulating the albuminous or similar matter, and removing foreign substances from the oil to gradually bring it to a state of purity.

A still further object is to extract oil from cocoanuts and other similar nuts by a process which will raise the melting point of the oil thus causing the product to retain the white appearance which it has upon leaving the mill, and furthermore adapting the products for culinary and household, as well as manufacturing purposes. And a still further object is to extract and refine the oil from cocoanuts and other similar nuts by a process resulting in an oil product and a nut by-product so constituted chemically as to be practically "neutral" and free from any taste or odor characteristic of the nut base.

The invention consists in the novel manner of treating the nut meat, or kernel, and the oil extracted therefrom as hereinafter set forth and described and more particularly pointed out in the claims hereto appended.

Heretofore various processes have been practiced for purifying and deodorizing oil extracted from cocoanuts or other similar nuts, but such have involved the use of various chemicals in such quantities as to disrupt the oil tissues. The product has been an oil liable to rapid fermentation and used in the useful art mainly in the manufacture of soaps. These processes, as a rule, have related only to the treatment of the oil after its extraction from the nut taking into no account the oxidization of, and fermentation in, the nut itself prior to the extraction of the oil, thus becoming processes merely of refining or rectification. The base for these processes has been an oil extracted from "copra", ordinarily in an advanced stage of fermentation and having already developed therein free fatty acids, all of which matter must be eliminated in the treatment of the oil. These processes fail to recognize the desirability of checking the fermentation in the nut at as early a stage as possible, and thus preventing the formation of such acids in material quantities, destroying the germ of fermentation, and eliminating the volatile products thereof prior to the extraction of the oil.

In my process or art I aim to avoid as much as possible the presence of products of fermentation in the base, by using the fresh or raw nut as distinguished from "copra" or dried nuts. Inasmuch as my process or art is particularly adaptable for use in connection with cocoanuts, I will describe the process more particularly in relation to such.

Inasmuch as fermentation is set up in the cocoanut very shortly after its removal from the tree, it is desirable to secure the nuts as fresh as possible and subject them to the process or art before they have had opportunity to age materially. However quickly they are subjected to the treatment, fermentation will have set up, but the development of injurious acids and the resultant deterioration of the meat or kernel increase more as the nut ages.

In carrying out my process, I first deshell the nut and remove the rind or outer skin thereof from the meat or kernel, and cut said meat or kernel in sections to remove the "milk." The meat is then given two successive baths in cold water to thoroughly wash same and remove any soluble superficial surface impurities.

In the following description, the treatment is such as to produce one ton of oil. After the cold baths, the nut kernels are removed to a solution containing a small percentage of permanganate of potash, to thoroughly cleanse the kernels superficially and check the deteriorating action of the oxidization which may have set up fermentation after the nut has been opened. Preparatory to the more important steps of the process the nuts are, after the last mentioned bath, disintegrated, macerated, or broken up in size and shape adapted to produce the character of by-product desired. The disintegrated nut is then subjected to a dry heat and the action of a moving current of dry hot air, or neutral gases such as superheated steam, under conditions which will not raise the temperature of the nut above 170 degrees Fahrenheit. This treatment, lasting from five to twenty minutes, removes the moisture from the nut tissues, both superficial and inherent, and also volatilizes and removes some of the volatile matter, thus effectively checking fermentation. This dry heat effects the above result by coagulating the starchy or mucilaginous matter of the meat to an extent to prevent the development of alcohol and volatile acids and eliminates the conditions attendant upon vegetable fermentation. As this starchy or mucilaginous matter is that first affected by fermentation, this step will tend to check, if not entirely prevent subsequent fermentation, particularly as it, at the same time, drives off the alcohol and volatile acids which form the basis for further deterioration. It also, as will more fully appear hereinafter, prevents the greater part of this starchy or mucilaginous matter being expressed with the oil, thus causing the run of oil to be fairly free from albuminous matter in suspension. The desiccated nut is thereafter subjected to a moist heat while being constantly agitated and having steam constantly discharged thereinto, the temperature of the mass during this step being maintained at substantially 155 degrees Fahrenheit. This treatment thoroughly disrupts any diseased cells, the free fatty acids and other products of fermentation being released and the volatile products being removed with, or absorbed by, the steam passing through the mass. This step brings the entire mass to a condition which will soften the oil cells sufficiently to permit the oil to be extracted therefrom. The temperature being above that at which albuminous matter ordinarily coagulates; there is no tendency to saturate the starchy or mucilaginous matter "set" by the preceding step even were the amount of moisture employed greater than that actually used, which is merely enough to give cohesion to the mass and soften the top of the molecules of the oil cells. This step also releases the free fatty acids and volatilizes any volatile acids not driven off by the dry heating or released by the disruption of the diseased or affected oil cells, which former are expressed with the oil, and which latter are absorbed by, or carried off with the steam.

The oil expressed is comparatively free from starchy or albuminous matter, the coagulated starchy or mucilaginous matter not passing through the press. Hence the greater volume of such matter, which ordinarily must be removed by filtration or otherwise, from the oil, is not present at this stage of my process; and hence the difficulty of subsequently eradicating same, which is essential to produce an oil which will not rapidly ferment or become rancid, is not presented.

The oil, after leaving the press, is thoroughly agitated by having saturated steam blown through the mass, raising the temperature thereof to substantially 180 degrees Fahrenheit. This treatment is continued until the albuminous, and other similar matter coagulates, the entire mass after treatment being allowed to settle until the coagulated matter rises to the surface or is precipitated. Thereafter this matter is removed. The entire mass is then filtered under a pressure of a trifle above one atmosphere to remove the small particles of sediment and precipitated impurities which cannot be removed by hand. The oil leaves the filter clear and fairly free of impurities and is mixed with about one third of its weight of water. This entire mass is brought to, and maintained at, a temperature of substantially 140 degrees Fahrenheit by having saturated steam blown thereinto for about two hours. This thoroughly washes the oil while maintaining it at a temperature which will prevent its solidification. At this stage of the process there is present in the oil in small soluble particles, or cells, a small quantity of acids which cannot be volatilized at the low temperature present during the previous treatment. To accomplish the release of these acids, I mix the oil with approximately eighty gallons of water having in solution from three to three and one quarter pounds of caustic soda of a strength of ninety-eight per cent., or substitute for such soda a three quarter per cent. solution of bi-carbonate of soda. The quantity of caustic soda or bi-carbonate of soda used in this solution will vary with the age of the nuts or with the lapse of time between the removal of the nuts from the tree and the extraction of the oil therefrom. This entire mass of oil and water is thoroughly agitated for twenty minutes and maintained at a temperature of substantially 145 degrees Fahrenheit. Thereafter it is allowed to settle for twenty minutes and a solution of sodium chlorid is added thereto and the entire mass again agitated for a further period of approximately twenty minutes. The sodium chlorid solution above referred to consists of about sixteen pounds of chlorid of sodium and one hundred and sixty pounds of water. This treatment serves to neutralize and precipitate the free fatty acids and other products of fermentation not previously removed from the oil. The entire mass is then permitted to settle for several hours. In practice I have found that four hours will produce excellent results. Thereafter the oil is separated from the solution and is washed in a solution of eighty gallons of water and eight pounds of sodium chlorid, the temperature being raised to and maintained at a point higher than the preceding bath. I have found that good results may be secured by maintaining this bath at a temperature of about one hundred and sixty degrees Fahrenheit. During this step the entire mass is thoroughly agitated to bring the oil and solution into intimate relation with each other, said treatment continuing for a period of about two hours. Thereafter the entire mass is allowed to settle for a period of time sufficient to precipitate the flocculent matter released, such requiring approximately three hours. The next step consists in washing the oil in clear water, the oil and water being agitated by a current of saturated steam discharged thereinto. This step is carried on for a sufficient length of time to drive off any remaining volatile matter. Thereafter the entire mass is allowed to settle for substantially three hours, and the water removed, the oil being subjected to a dry heat at a temperature of substantially 212 degrees Fahrenheit, to "dry" the oil.

If the nuts from which the oil has been extracted, were reasonably fresh, the next step would be to subject the oil to a dry heat of substantially 275 degrees Fahrenheit for a period of about one and one half hours, such treatment preferably being carried on under a more or less perfect vacuum. This treatment serves to remove any remaining volatile acids and odorous matter in the oil; and at the same time raises the melting point thereof in a manner to increase the quality of the product and its usefulness in various connections. If, however, the nuts from which the oil has been extracted have aged between the time of harvesting and their being subjected to this process, I employ two steps antecedent to the process described, as follows:—First the oil is mixed with three quarters of a per cent. of dry animal charcoal and thoroughly agitated, and while being so agitated is maintained at a temperature of substantially 165 degrees Fahrenheit, the entire treatment continuing for substantially twenty minutes. The small particles of charcoal mixed throughout the mass of oil absorb any impurities in the oil and are thereafter removed by filtration. After filtration the oil is again mixed with clear water and agitated by the injection of wet steam into the mixture for a period of approximately two hours, steam being used to preserve the fluid condition of the oil. The steam also carries off any volatile matter separated by this heat. When these intermediate steps are employed, the high temperatures will serve to not only purify the oil, as described, but also to dry same. After the oil has been dried it is reduced to a semi-fluid state by subjecting it to a heat of substantially 61 degrees Fahrenheit under normal atmospheric conditions. In the process of cooling any impure gases rising from the mass of oil are taken up by the air. While in this semi-fluid state, the oil is thoroughly mixed with a weak preparation of calcium hydroxid for approximately fifteen minutes to clean the surface of the oil or as much thereof as can be brought into contact with the calcium hydroxid. During this step the temperature is maintained at substantially 61 degrees Fahrenheit, and after being thoroughly mixed the oil is allowed to settle and the solution is run off. Thereafter, the oil in its semi-fluid state is thoroughly washed in clear water for substantially twenty minutes and subsequently is treated to a bath consisting of a weak solution of calcium oxid, for a short time. To remove all traces of the last solution, the oil is then thoroughly cleansed in clear cool, running water of substantially 61 degrees Fahrenheit.

During the treatment at low temperature, the oil is in a semi-fluid condition, the manner of working it being similar to that of working butter in a dairy. The oil thus produced is then ready for the market and is either pressed into cakes or heat dried to render it fluid preparatory to running it into vessels wherein it is subsequently permitted to cool. This product, it will be found, is a pure, sweet, white, tasteless, odorless and neutral oil or fat, suitable for use as a food stuff as well as for use in the useful arts. By the terms odorless and tasteless, I refer only to the distinct and characteristic taste and odor of the cocoanut.

The various baths containing caustic soda or sodium chlorid and calcium oxid, are introduced at intervals throughout the process to check any tendency toward fermentation through the introduction of impurities in handling the oil and the action of the air thereon, while the oil is being treated and is in a heated condition, the solutions containing these agents being weak do not, of themselves, eliminate any of the deleterious qualities excepting in those minor respects above referred to, serving rather to prevent, than to remove the products of, fermentation.

It will be observed that the oil in most of the steps of the process is maintained at a temperature which while not sufficiently high to disrupt the oil tissues, will preserve it in a fluid state and free the volatile acids and other similar matter released during the subjection of the oil to the various steps of the process.

Throughout the entire process I endeavor to prevent the formation or development of injurious qualities in the oil and thus avoid the necessity for using strong solvents in such quantities as would result in the saponification of the oil, which would result were these qualities permitted to develop and were thereafter eliminated. It will be also observed that after subjecting the oil to the various solutions above referred to, I immediately remove any trace of such solution by a thorough washing of the oil and at the same time eliminating, through evaporation, any acids in the oil or contained in the solution. Throughout the process, prior to the treatment under low temperatures, the oil is preserved in a fluid state and the steps are proportioned as to their duration and the volume of oil being treated as to permit of continuity in practicing the art or process.

I have found that the product of this process is a pure, edible fat which can be preserved indefinitely, some of it having remained pure and sweet for an interval of approximately two years immediately preceding the filing of this application. The by-product of desiccated cocoanut referred to above also possesses this characteristic of purity and the absence of liability to fermentation, although such is subject to but two steps of the process. This I attribute to the fact that the cells containing deleterious acids respond more readily to pressure than the normal healthy cells, and that the main impurities are carried away with the oil then retained in the meat of the nut. The dry heat also has the effect of setting the starchy or mucilaginous matter to a degree to prevent the fungus attacking the same in a manner to start fermentation.

Having described my invention what I claim as new and desire to have protected by Letters Patent is:—

1. The herein described process for treating the meat or kernel of fresh cocoanuts and other similar nuts consisting of first subjecting a mass of disintegrated or macerated fresh meat of the nut to a dry heat at a temperature above that at which the albuminous or mucilaginous matter coagulates or sets, and below 212 degrees Fahrenheit, whereby fermentation is checked through the coagulation of the albuminous or mucilaginous matter, and the volatilization of volatile acids, and some of the acids are volatilized and removed; thereafter subjecting the mass to a moist heat at a temperature above that at which said albuminous or mucilaginous matter coagulates and below 212 degrees Fahrenheit whereby the oil cells are softened and the volatile acids are removed, and thereafter pressing the mass to extract the oil therefrom and form a by-product of desiccated nut.

2. The herein described process for treating the meat or kernel of fresh cocoanuts and other similar nuts consisting of first subjecting a mass of disintegrated or macerated fresh meat of the nut to a dry heat at a temperature above that at which the albuminous or mucilaginous matter coagulates or sets, and below 212 degrees Fahrenheit, whereby fermentation is checked, through the coagulation of the albuminous or mucilaginous matter, and the volatilization of volatile acids, and some of the acids are volatilized and removed, thereafter subjecting the mass to a moist heat at a temperature above that at which said albuminous or mucilaginous matter coagulates and below 212 degrees Fahrenheit whereby the oil cells are softened and the volatile acids are removed, thereafter pressing the mass to extract the oil therefrom and form a by-product of desiccated nut, and thereafter coagulating the albuminous and other similar matter and removing same from the oil or fat.

3. The herein described process for treating the meat or kernel of fresh cocoanuts and other similar nuts consisting of first subjecting a mass of disintegrated or macerated fresh meat of the nuts to a dry heat at a temperature above that at which the albuminous or mucilaginous matter coagulates or sets, and below 212 degrees Fahrenheit, whereby fermentation is checked through the coagulation of the albuminous or mucilaginous matter, and the volatilization of volatile acids, and some of the volatile acids are volatilized and removed, thereafter subjecting the mass to a moist heat at a temperature above that at which said albuminous or mucilaginous matter coagulates, and below 212 degrees Fahrenheit, whereby the oil cells are softened, and the volatile acids are removed, thereafter pressing the mass to extract the oil therefrom and form a by-product of desiccated nut, thereafter coagulating the albuminous and other similar matter and removing same from the oil or fat, and thereafter subjecting the oil to a succession of baths containing weak solutions of caustic soda, and chlorid of sodium, at a temperature below 212 degrees Fahrenheit whereby the free fatty acids and flocculent matters are removed and precipitated, and said solutions are removed from the oil.

4. The herein described process for treating the meat or kernel of fresh cocoanuts and other similar nuts consisting of first subjecting a mass of disintegrated or macerated fresh meat of the nut to a dry heat at a temperature above that at which the albuminous or mucilaginous matter coagulates or sets, and below 212 degrees Fahrenheit whereby fermentation is checked, through the coagulation of the albuminous and mucilaginous matter, and the volatilization of volatile acids, and some of the volatile acids are volatilized and removed, thereafter subjecting the mass to a moist heat at a temperature above that at which said albuminous or mucilaginous matter coagulates, and below 212 degrees Fahrenheit whereby the oil cells are softened and the volatile acids are removed, thereafter pressing the mass to extract the oil therefrom and form a by-product of desiccated nut, thereafter coagulating the albuminous or other similar matter, and removing same from the oil or fat, thereafter subjecting the oil to a succession of baths, containing a weak solution of caustic soda, and chlorid of sodium at a temperature below 212 degrees Fahrenheit whereby the free fatty acids and flocculent matter are removed and precipitated, and the said solutions are removed from the oil, and subjecting the oil thereafter to a dry gas at a temperature above 212 degrees Fahrenheit to dry same and raise the melting point of the product.

5. The herein described process for treating the meat or kernel of fresh cocoanuts and other similar nuts consisting of first subjecting a mass of disintegrated or macerated fresh meat of the nut to a dry heat at a temperature above that at which the albuminous or mucilaginous matter coagulates or sets, and below 212 degrees Fahrenheit, whereby fermentation is checked through the coagulation of the albuminous or mucilaginous matter, and the volatilization of volatile acids and some of the volatile acids are volatilized and removed, thereafter subjecting the mass to a moist heat at a temperature above that at which said albuminous or mucilaginous matter coagulates, and below 212 degrees Fahrenheit whereby the oil cells are softened and the volatile acids are removed, thereafter pressing the mass to extract the oil therefrom and form a by-product of desiccated nut, thereafter coagulating the albuminous and other similar matter and removing same from the oil or fat, thereafter subjecting the oil to a succession of baths containing a weak solution of caustic soda, and chlorid of sodium, at a temperature below 212 degrees Fahrenheit whereby free fatty acids and flocculent matter are removed from the oil, and the said solutions are removed from the oil, thereafter agitating the said oil with dry animal charcoal at a temperature below 212 degrees Fahrenheit filtering the oil to remove said charcoal, and subjecting the oil thereafter to a dry gas at a temperature above 212 degrees Fahrenheit to dry same and raise the melting point of the product.

6. The herein described process for treating the meat or kernel of fresh cocoanuts and other similar nuts consisting of first subjecting a mass of disintegrated or macerated fresh meat of the nut to a dry heat at a temperature above that at which the albuminous or mucilaginous matter coagulates or sets, and below 212 degrees Fahrenheit, whereby fermentation is checked through the coagulation of the albuminous or mucilaginous matter, and the volatilization of the volatile acids, and some of the volatile acids are volatilized and removed, thereafter subjecting the mass to a moist heat at a temperature above that at which said albuminous or mucilaginous matter coagulates, and below 212 degrees Fahrenheit, whereby the oil cells are softened, and the volatile acids are removed, thereafter pressing the mass to extract the oil therefrom and form a by-product of desiccated nut, thereafter coagulating the albuminous and other similar matter and removing same from the oil or fat, thereafter subjecting the oil to a succession of baths containing a weak solution of caustic soda, and chlorid of sodium, at a temperature below 212 degrees Fahrenheit, whereby free fatty acids and flocculent matter are removed from the oil, thereafter agitating the said oil with dry animal charcoal at a temperature below 212 degrees Fahrenheit, filtering the oil to remove said charcoal, subjecting the oil thereafter to a temperature of substantially 60 degrees Fahrenheit while agitating and washing same in a solution of calcium oxid or calcium hydroxid, and thereafter subjecting same to successive baths of water with calcium oxid in solution or calcium hydroxid, and in running water at a temperature of substantially 60 degrees Fahrenheit.

7. The herein described process for treating the meat or kernel of cocoanuts and other similar nuts consisting of first subjecting a mass of disintegrated or macerated fresh meat of the nut to a dry heat at a temperature above that at which the albuminous or mucilaginous matter coagulates and below 212 degrees Fahrenheit whereby fermentation is checked through the coagulation of the albuminous or mucilaginous matter and the volatilization of volatile acids, and some of the volatile acids are volatilized and removed, and thereafter subjecting the mass to a moist heat at a temperature above that at which said albuminous or mucilaginous matter coagulates and below 212 degrees Fahrenheit whereby the oil cells are softened and the volatile acids are removed, thereafter pressing the mass to extract the oil therefrom to form a by-product of desiccated nut, thereafter coagulating the albuminous and other similar matter and removing same from the oil or fat, thereafter subjecting the oil to a succession of baths containing a weak solution of caustic soda, and, chlorid of sodium at a temperature below 212 degrees Fahrenheit whereby the free fatty acids and flocculent matter are removed and precipitated and the said solutions are removed from the oil, thereafter subjecting the oil to a temperature of substantially 60 degrees Fahrenheit while agitating and washing same in a solution of calcium oxid or calcium hydroxid, and thereafter subjecting same to successive baths of water, with calcium oxid in solution or calcium hydroxid and in running water at a temperature of substantially 60 degrees Fahrenheit.

In witness whereof I have affixed my signature this 21st day of March 1907, in the presence of two witnesses.

GEORGE C. WARR.

Witnesses:
CHARLES R. EAST,
JOHN M. BEADMAN.